United States Patent [19]

Sarishvili et al.

[11] Patent Number: 4,981,700
[45] Date of Patent: Jan. 1, 1991

[54] PROCESS FOR PRODUCING SPARKLING WINES

[76] Inventors: Naskid G. Sarishvili, ulitsa Khalturinskaya, 11, kv. 231; Evgeny N. Storchevoi, Nakhimovsky prospekt, 9, korpus 1; Vyacheslav M. Vaganov, ulitsa Scherbakovskaya, 50/52, kv. 6; Bella B. Reitblat, alleya Zhemchugovoi, 3, kv. 85, all of, Moscow, U.S.S.R.

[21] Appl. No.: 239,334
[22] PCT Filed: Nov. 5, 1987
[86] PCT No.: PCT/SU87/00123
   § 371 Date: Jun. 22, 1988
   § 102(e) Date: Jun. 22, 1988
[87] PCT Pub. No.: WO88/03557
   PCT Pub. Date: May 19, 1988

[30] Foreign Application Priority Data

Nov. 14, 1986 [SU] U.S.S.R. .................. 4146074
Jul. 14, 1987 [SU] U.S.S.R. .................. 4268009

[51] Int. Cl.$^5$ .................................... C12G 1/06
[52] U.S. Cl. ............................... 426/13; 426/15; 426/62; 426/592
[58] Field of Search .............. 426/13, 15, 592, 62

[56] References Cited

U.S. PATENT DOCUMENTS

| | | | |
|---|---|---|---|
| 3,062,656 | 11/1962 | Agabalianz et al. | 426/15 |
| 3,545,978 | 12/1970 | Gerasimovich et al. | 426/15 |
| 4,265,914 | 5/1981 | Sarishvili et al. | 426/15 |
| 4,504,496 | 3/1985 | Underberg et al. | 426/15 |

*Primary Examiner*—Marianne Cintins
*Attorney, Agent, or Firm*—Burgess, Ryan & Wayne

[57] ABSTRACT

The invention relates to the technology of making beverages.

The process of the invention for producing sparkling wines is carried out in a continuous flow by deaerating a blend of white wine materials in the presence of yeast immobilized on a sorbent. The deaerated blend of white wine materials in a mixture with liqueur is introduced into a champagnization zone, wherein a layer of a sorbent is provided, under this layer of sorbent. The yeast required for carrying out secondary fermentation in the champagnization zone and enriching the wine being champagnized with biologically active substances is subjected to adaptation to the champagnization process conditions. To this end, the yeast is placed into the champagnization zone, where the yeast is kept for a certain period of time, isolated from the wine being champagnized. On completion of the adaptation, the yeast is mixed with liqueur and fed under the layer of sorbent for effecting the champagnization, a mixture of the blend with liqueur being also fed under said layer of sorbent.

The champagnized sparkling wine this produced is chilled, filtered and directed to bottling.

4 Claims, 1 Drawing Sheet

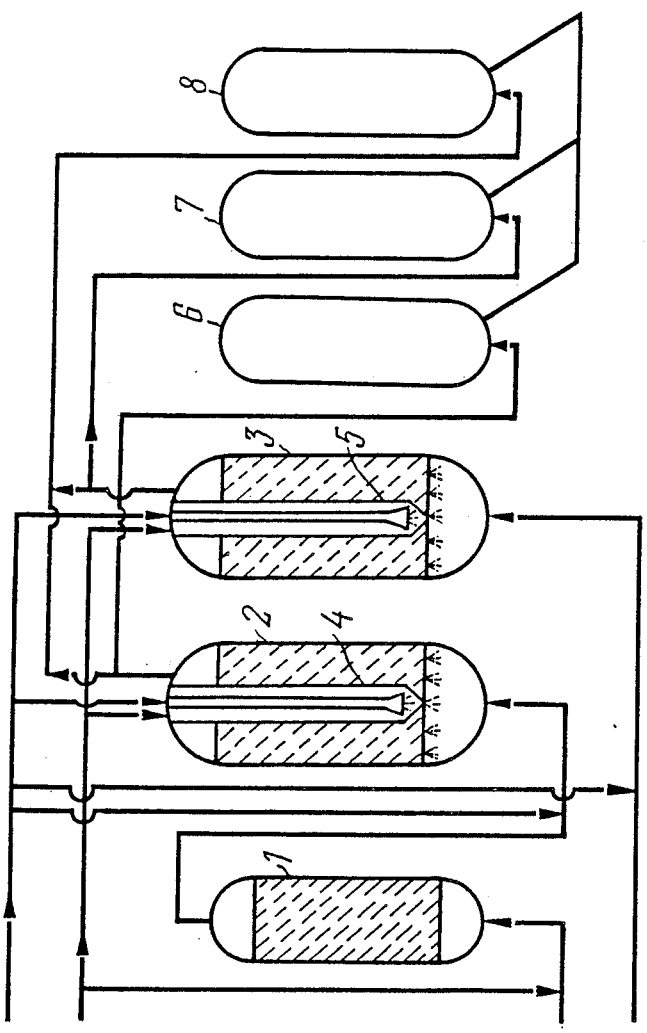

PROCESS FOR PRODUCING SPARKLING WINES

FIELD OF THE ART

The present invention relates to the technology of making beverages, particularly, to the technology of making wine and still more specifically, to a process for producing sparkling wines.

PRIOR ART

Known in the art is a process for producing white or red sparkling wines in a continuous flow, wherein blend white wine materials are subjected to deaeration in the presence of yeast immobilized on a sorbent. Then a fermentation mixture is prepared from white or red blend wine materials, tank liqueur, and yeast, so that the content of yeast cells in the fermentation mixture should be 3-5 mln/ml. The resulting fermentation mixture is supplied in a continuous flow to a champagnization zone, wherein a layer of sorbent in provided, on which the yeast cells are retained continuously. In the champagnization zone secondary fermentation is effected, alongside of enrichment of the wine with biologically active substances that are products of yeast autolysis. The sparkling wine outgoing from the champagnization zone is chilled, filtered, and bottled (SU, A, 582279).

In accordance with the prior-art process, young yeast after having been grown under aerobic conditions is introduced into the fermentation mixture supplied to the champagnization zone. In this case the fermentation activity of the yeast is not sufficient for an effective functioning under the champagnization conditions. Furthermore, the quantity of liqueur, required for the secondary fermentation, is fed to the fermentation mixture in one flow. Under these conditions readaptation of the yeast for the anaerobic vital activity slows down.

As a result, the biosynthetic functions of the yeast weaken, the fermentation of sugar at the stage of secondary fermentation is incomplete, and, as a consequence, the secondary fermentation stage becomes longer, whereas the stage of enriching the wine with biologically active substances, at which the high organoleptic characteristics of sparkling wine are formed, is shortened.

The prior-art process gives sparkling wines scored at 8.8-9.0 in terms of the ten-point hedonic scoring system. This is inferior to the organoleptic characteristics inherent in the sparkling wine prepared by the classical procedure (in bottles).

Furthermore, at present in the production of rose sparkling wines a periodic procedure is used (in tanks) (cf. "Technological Instructions for the Production and Quality Control of Sparkling Wines", 1971). A blend for rose sparkling wine is prepared from rose wine materials or by blending red and white wine materials. Liqueur and yeast are introduced into the blend, and the mixture is subjected to champagnization. The resulting rose sparkling wine is chilled, mixed, if necessary, with expedition liqueur, filtered and bottled.

With this procedure the resulting product cannot be standard in its organoleptic properties, colour and other physico-chemical characteristics, because in the process of champagnization of rose blend wines their colour changes, the intensity of the specific aroma and taste, characteristics of rose and red wine materials, declines. Each lot of finished wine differs in the above-cited characteristics.

DISCLOSURE OF THE INVENTION

The present invention is directed to the provision of a process for producing sparkling wines noted for an improved quality, differing in their taste, aroma, and colour, by enhancing the biosynthetic functions of yeast.

Said object is accomplished due to the fact that in a process for producing sparkling wines in a continuous flow, comprising deaeration of a blend of white wine materials in the presence of yeast, immobilized on a sorbent, supply of a blend of red wine materials or deaerated white wine materials, liqueur and yeast to a champagnization zone, wherein a layer of a sorbent is provided, for effecting secondary fermentation, for enriching the wine undergoing champagnization with the products of autolysis of the yeast immobilized on the sorbent; chilling, filtering and bottling of the wine; according to the present invention, in the champagnization zone adaptation of the yeast to the champagnization conditions is effected, precluding the contact of the yeast with the wine subjected to the champagnization, before the completion of the adaptation the yeast being mixed with one part of the liqueur, then the mixture of the adapted yeast with the liqueur is introduced under the layer of the sorbent, a blend of white or red wine materials together with another part of the liqueur is also supplied thereto for carrying out secondary fermentation and subsequent enrichment of the wine being champagnized with the yeast autolysis products.

The present invention enables an improvement in the quality of the finished product to 9.3-9.5 (in terms of the ten-point hedonic scoring system due to an increase in the duration of the process of enriching wine with the biologically active substances of the yeast, the overall duration of the champagnization process remaining unchanged.

With the process of the invention the organoleptic properties attainable are as high as those characteristic of champagne and sparkling wines produced in accordance with the classical procedure (in bottles).

In the process of the invention it is expedient that yeast should be mixed with a liqueur taken in an amount ensuring the concentration of sugar in the adapted yeast equal to the concentration of sugar in the wine undergoing champagnization, which is found under the layer of sorbent.

This condition being met, the process of secondary fermentation will be intensified, while its duration will be cut down.

In accordance with the present invention, for the production of rose sparkling wine with various intensity of colour, it is expedient that a blend of red wine materials and deaerated white wine materials should be subjected to champagnization separately, and red and white champagnized wine should be blended in proportions ensuring constant organoleptic and physicochemical characteristics of the resulting rose sparkling wine.

BRIEF DESCRIPTION OF THE DRAWING

FIG. 1 is a flow-sheet of a process for producing sparkling wines in a continuous flow, according to the invention.

Further objects and advantages of the present invention will be become apparent from a detailed description of the process for producing sparkling wines, examples illustrating how the process is carried into effect.

BEST WAY OF CARRYING THE INVENTION INTO EFFECT

When sparkling wines are produced in a continuous flow, the starting components are white and red wine materials, liqueur and yeast.

The yeast is divided into two parts. When white wine materials are used, they must be subjected to deaeration prior to champagnization. To this end, a blend of white wine materials is mixed with one part of the yeast. The resulting mixture is directed in the form of a continuous flow to a deaeration zone, filled with a sorbent. In this deaeration zone at a temperature of 10°–12° C. the oxygen of the blend is consumed by the yeast immobilized on the sorbent.

The sorbent comprises cylindrical or annular elements made of wood, polyethylene or ceramics.

When the blend of white wine materials is in contact with the yeast fixed on the sorbent, the yeast consumes the oxygen dissolved in the wine materials. Concurrently, the blend becomes enriched with the biologically active substances of the yeast, and the quality of the blend are improved.

The white or red wine materials thus deaerated are mixed with 35–40% of the total amount of liqueur, and directed as a continuous flow to a champagnization zone, wherein a sorbent layer is provided, similar to that described hereinabove.

Simultaneously with the deaeration of the blend of white wine materials, the other part of the yeast, having a fermentation activity of 8–10 $\mu$l.ml/mln.h, is directed as a continuous flow to adaptation, effected in the champagnization zone. In the course of the adaptation direct contact of the yeast with the wine being champagnized is excluded. Before the completion of said adaptation the yeast is mixed with the other part of liqueur. The yeast delivered to the adaptation, under the effect of conditions arising in the process of wine champagnization, gradually change its physiological activity and readjust the vital activity from the aerobic to the anaerobic one. Experimental investigations have shown that on completion of the adaptation the specific fermentation activity of the yeast amounts of 15–20 $\mu$l.ml/mln.h, this being 1.8–2 times that of the yeast which has not undergone adaptation.

In accordance with the present invention, the yeast to be subjected to adaptation, is mixed with a liqueur, taken in an amount ensuring the concentration of sugar in the adapted yeast equal to the concentration of sugar in the wine being champagnized, found under the sorbent layer.

The yeast which has passed adaptation to the champagnization conditions and mixed with the liqueur comes as a continuous flow from the adaptation zone to the champagnization zone, where it gets under the sorbent layer. A mixture of a blend of white or red wine materials with the liqueur is also fed thereto in a continuous flow. In the champagnization zone located under the sorbent layer a process of secondary fermentation occurs with the participation of the adapted yeast at a temperature of 10°–12° C. and pressure of 500–600 kPa. Then the stream of wine with the yeast comes to the layer of the sorbent, where complete after-fermentation of sugar occurs, together with the process of enriching the wine with the biologically active substances of the yeast (vitamins, enzymes, peptides, amino acids), and the reduction processes are intensified.

Thus, in accordance with the present invention, for the champagnization of wine use is made of yeast, adapted to the champagnization conditions, as it is the case in the classical procedure of making sparkling wines in bottles. As a result of the attained smooth, synchronous changes in the physiological activity of the yeast and in the biochemical processes occuring in the wine being champagnized, it has become possible to obtain high-quality sparkling wine (scored at 9.3–9.5 in terms of the ten-point hedonic scoring system).

The wine coming from the champagnization zone is chilled, added, if necessary, with expedition liqueur, filtered and directed to bottling.

In accordance with the present invention, in the case of producing rose sparkling wine and red and white sparkling wines, the process flow sheet comprises two champagnization zones. In one of the champagnization zones white sparkling wine is made from white wine materials; in the second champagnization zone red sparkling wine is made from red wine materials. By varying the ratio of the white and red wine, rose sparkling wine of a desired colour and taste is produced.

The process of the invention allows the preparation of sparkling wines of all varieties, from "brut" to sweet ones, and of different kinds: white, red and rose.

For a better understanding of the present invention examples of its specific embodiment are given hereinbelow.

EXAMPLE 1

One part of the total amount of yeast is introduced into a blend of white wine materials so that the proportion should be 2–3 mln cells/ml. The mixture obtained is directed as a continuous flow to apparatus 1 for dearation of the white wine materials.

The deaerated wine materials are mixed with 35% of the total amount of a liqueur and directed as a continuous flow to apparatus 2 for champagnization and producing white sparkling wine.

Red wine materials are mixed with 35% of the total amount of liqueur and directed as a continuous flow to apparatus 3 for champagnization and producing red sparkling wine. The second and third parts of the yeast are directed as continuous flows to the apparatus 2 and 3, respectively, into a adaptation zones 4 and 5, wherein in five days the yeast changes its physiological activity. An increase in the fermentation activity of the yeast to 18 $\mu$l.ml/mln.h the result of introducing liqueur in an amount of 15% of its total quantity into the lower part of the adaptation zones 4 and 5 three hours before the completion of the adaptation.

The yeast that has undergone adaptation to the champagnization conditions and mixed with the liqueur comes in a continuous flow from the adaptation zones 4 and 5 under the sorbent layers in the apparatus 1 and 2 for champagnization.

Under the same sorbent layers, as has been stated hereinabove, a mixture of a blend of white wine materials with liqueur and a mixture of a blend of red wine materials with liqueur are fed in continuous flows, and a process of secondary fermentation commences there.

In the apparatus 1 and 2 in the champagnization zones on the sorbent layer there take place complete after-fermentation of sugar and enrichment of the resulting white and red wine with the biologically active substances of the yeast.

After the champagnization, each of the two flows of wine, coming from the apparatus 2 and 3, is divided into two parts in a ratio of 1:1. The part of the wine flow coming from the apparatus 2 and the part of the wine flow coming from the apparatus 3 are directed to receivers 6 and 7 for white and red sparkling wine, respectively. The remaining parts of the flows of the white and red sparkling wine produced, coming from the apparatus 2 and 3, are directed to receiver 8 for making rose sparkling wine. Varying the ratio of these remaining parts of the white and red sparkling wine flows, one obtains rose sparkling wine having a colour intensity of 0.3 conventional units, as determined colorimetrically, and scored at 9.4 in terms of the ten-point hedonic scoring system. The wine from the receivers 6, 7 and 8 is chilled, added with expedition liqueur, filtered and directed to bottling.

EXAMPLE 2

Into a blend of white wine materials yeast is introduced in such an amount that the proportion should be 2–3 mln cells per ml, and the mixture is directed to apparatus 1 for deaeration. Then 35% of the total flow of a tank liqueur is introduced into the flow of the deaerated blend, and the mixture is directed to apparatus 2 for champagnization. A second flow of yeast is directed to adaptation zone 4, where during a period of five days the yeast changes its physiological activity. An increase in the fermentation activity of the yeast to 18 $\mu$l.ml/mln.h occurs due to introducing tank liqueur in an amount of 15% of its total quantity into the lower part of the adaptation zone 4 three hours before the completion of the adaptation. The adapted yeast comes to the apparatus 2 under the sorbent layer, where secondary fermentation takes place. Then the wine being champagnized passes through the sorbent layer, where this wine is enriched with the products of autolysis of the yeast fixed on the sorbent.

35% of the total quantity of the tank liqueur is introduced into a blend of red wine materials and the mixture is directed to apparatus 3 for champagnization. A third flow of the yeast is directed to adaptation zone 5. In this flow the yeast during a period of five days is prepared for the champagnization conditions. Three hours before the adapted yeast comes to the champagnization, tank liqueur is introduced into the adaptation zone 5 in an amount of 15% of the total quantity of the liqueur. Then the yeast is fed to the lower zone of the apparatus 3 under the layer of sorbent, where secondary fermentation takes place. On the sorbent yeast cells, which have come to the champagnization zone, become fixed, afterfermentation and enriching of the red wine being champagnized with biologically active substances occur.

The champagnized white wine coming from the upper zone of the apparatus 2 is directed to receiver 6, chilled, added with expedition liqueur, filtered and directed to bottling.

The champagnized red wine coming from the upper zone of the apparatus 3 is directed to receiver 7, chilled added with expedition liqueur, filtered and directed to bottling. The white and red sparkling wine thus produced is scored at 9.5 in terms of the ten-point hedonic scoring system.

EXAMPLE 3

The process is effected under the conditions similar to those described in Example 1, the difference being in that 40% of the total quantity of tank liqueur is introduced into the flow of the deaerated blend of white wine materials and 40% of the total quantity of the tank liqueur is introduced into the flow of red wine materials; 10% of the total quantity of the liqueur is introduced into adaptation zones 4 and 5, each. In this case the liqueur is introduced into the adaptation zone five hours before feeding yeast into the wine being champagnized. The fermentation activity of the yeast increases to 15 $\mu$l.ml/mln.h.

Red champagnized wine directed to receiver 8 ensures in the rose sparkling wine thus produced a intensity of colour equal to 0.5 conventional units, as determined colorimetrically, and scoring at 9.5 in terms of the ten-point hedonic scoring system.

Industrial Applicability

The present invention will be most useful in making sparkling wines by a continuous method in tanks.

We claim:

1. A process for the production of sparkling wines in a continuous flow cmprising deaerating white wine stock in the presence of a first portion of yeast; supplying deaerated white or red wine stock, liquor and adapted yeast to a champagnization zone for a secondary fermentation, wherein the wine under champagnization is enriched with products of autolysis of the adapted yeast immobilized on a sorbent layer, and wherein adaptation of the adapted yeast required for the secondary fermentation is carried out separately from the wine under champagnization, and wherein prior to the completion of the yeast adaptation, the yeast being adapted and liquor are mixed and the adapted yeast and liquor then introduced under the sorbent layer, and the white or red wine stock and liquor also being supplied under the sorbent layer.

2. A process according to claim 1, wherein rose sparkling wine is produced from white and red wine stock which are initially subjected to champagnization separately from each other, and then mixed at a ratio ensuring constant organoleptic and physico-chemical characteristics of the rose sparkling wine.

3. A process for producing sparkling wines in a continuous flow comprising the steps of:
   (1) mixing white wine stock with yeast to form a first mixture;
   (2) deaerating the first mixture containing the white wine stock;
   (3) mixing red wine stock with a second portion of yeast to form a second mixture;
   (4) mixing each of said first and second mixtures separately with liquor and introducing them into separate champagnization zones containing sorbent layers;
   (5) introducing additional yeast separately and simultaneously into the respective champagnization zones for adapting said yeast out of contact with the wine being champagnized;
   (6) mixing said additional yeast with liquor and introducing said yeast and liquor under the sorbent layer in the separate champagnization zones; and
   (7) withdrawing the white and red champagnized wines from said respective champagnization zones.

4. A process according to claim 3, wherein the white and red champagnized wines are mixed to produce rose sparkling wine.

* * * * *